US007275180B2

(12) United States Patent
Armstrong et al.

(10) Patent No.: US 7,275,180 B2
(45) Date of Patent: Sep. 25, 2007

(54) TRANSPARENT REPLACEMENT OF A FAILING PROCESSOR

(75) Inventors: William Joseph Armstrong, Rochester, MN (US); Naresh Nayar, Rochester, MN (US); Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 10/418,598

(22) Filed: Apr. 17, 2003

(65) Prior Publication Data

US 2004/0221193 A1 Nov. 4, 2004

(51) Int. Cl.
G06F 11/00 (2006.01)
G06F 11/20 (2006.01)

(52) U.S. Cl. .......................................... 714/13; 714/10
(58) Field of Classification Search ................... 714/13
See application file for complete search history.

(56) References Cited

U.S. PATENT DOCUMENTS

| | | | | |
|---|---|---|---|---|
| 4,415,973 A | * | 11/1983 | Evans | 714/11 |
| 5,815,651 A | * | 9/1998 | Litt | 714/10 |
| 6,189,112 B1 | * | 2/2001 | Slegel et al. | 714/10 |
| 6,378,021 B1 | * | 4/2002 | Okazawa et al. | 710/317 |
| 6,516,429 B1 | * | 2/2003 | Bossen et al. | 714/47 |
| 6,574,748 B1 | * | 6/2003 | Andress et al. | 714/11 |
| 6,728,668 B1 | * | 4/2004 | Kitamorn et al. | 703/22 |
| 6,950,978 B2 | * | 9/2005 | Arndt et al. | 714/800 |
| 6,957,435 B2 | * | 10/2005 | Armstrong et al. | 718/104 |
| 7,058,743 B2 | * | 6/2006 | Ostrovsky et al. | 710/260 |
| 2002/0116670 A1 | * | 8/2002 | Oshima et al. | 714/55 |

FOREIGN PATENT DOCUMENTS

| | | |
|---|---|---|
| JP | 03-282639 | 12/1991 |
| JP | 11-154099 | 6/1999 |
| JP | 3070282 | 5/2000 |
| JP | 2002-229659 | 8/2002 |

OTHER PUBLICATIONS

Unix Guide Faq http://www.unixguide.net/ibm/faq/faq1.145,shtml.*
Wikipedia's Operating System http://en.wikipedia.org/w/index.php?title=Operating_system&printable=yes, revision from Mar. 13, 2007.*
Wikipedia's Device Driver http://en.wikipedia.org/w/index.php?title=Device_driver&printable=yes, revision from Mar. 10, 2007.*

* cited by examiner

Primary Examiner—Scott Baderman
Assistant Examiner—Joseph Schell
(74) Attorney, Agent, or Firm—Patterson & Sheridan, LLP (57) ABSTRACT

Methods, systems, and articles of manufacture for replacement of a failing processor of a multi-processor system running at least one operating system are provided. In contrast to the prior art, the replacement may be performed by system firmware without intervention by the operating system (i.e., the replacement may be transparent to the operating system). For some embodiments, the multi-processor system may be logically partitioned and the methods may be utilized to replace one or more shared or dedicated processors assigned to a logical partition, transparent to an operating system running on the partition.

20 Claims, 5 Drawing Sheets

TRANSPARENT REPLACEMENT OF A FAILING PROCESSOR

BACKGROUND OF THE INVENTION

1. Field of the Invention

The present invention generally relates to multi-processor computer systems and more particularly to replacing a failing processor in a manner that is transparent to an operating system.

2. Description of the Related Art

In a computing environment, parallel processing generally refers to performing multiple computing tasks in parallel. Traditionally, parallel processing required multiple computer systems, with the resources of each computer system dedicated to a specific task, or allocated to perform a portion of a common task. However, recent advances in computer hardware and software technologies have resulted in single computer systems capable of highly complex parallel processing, through the use of multiple processors.

In some cases, a multi-processor system is logically partitioned, with one or more of the processors dedicated to, or shared among, each of several logical partitions. In a logically partitioned computer system, available system resources (including the processors, memory, and various I/O devices) are allocated among multiple logical partitions, each designed to appear to operate independently of the other. Management of the allocation of resources among logical partitions is typically accomplished via a layer of system firmware, commonly referred to as a partition manager.

An objective of the partition manager is to allow each logical partition to independently run software (e.g., operating systems and operating system-specific applications), typically developed to run on a dedicated computer system, with little or no modification. For example, one logical partition may be running a first operating system, such as IBM's OS/400, a second logical partition may be running a second operating system, such as IBM's AIX, while a third logical partition may be running a third operating system, such as Linux. By providing the ability to run multiple operating systems on the same computer system, a logically partitioned system may provide a user with a greater degree of freedom in choosing application programs best suited to the user's needs with little or no regard to the operating system for which an application program was written.

Logical partitioning of a large computer system has several potential advantages. For example, a logically partitioned computer system is flexible in that reconfiguration and re-allocation of resources may be easily accomplished without changing hardware. Logical partitioning also isolates tasks or groups of tasks, which may help prevent any one task or group of tasks from monopolizing system resources. Logical partitioning may also facilitate the regulation of resources provided to particular users, which may be integral to a business model in which the computer system is owned by a service provider who provides computer services to different users on a fee-per-resource-used or "capacity-on-demand" basis. Further, as described above, logical partitioning makes it possible for a single computer system to concurrently support multiple operating systems, since each logical partition can be executing in a different operating system.

Additional background information regarding logical partitioning can be found in the following commonly owned patents and patent applications, which are herein incorporated by reference: Ser. No. 09/672,043, filed Sep. 29, 2000, entitled "Technique for Configuring Processors in System With Logical Partitions"; Ser. No. 09/346,206, filed Jul. 1, 1999, entitled "Apparatus for Supporting a Logically Partitioned Computer System"; U.S. Pat. No. 6,467,007, entitled "Processor Reset Generated Via Memory Access Interrupt"; U.S. Pat. No. 5,659,786, entitled "System And Method For Dynamically Performing Resource Reconfiguration In A Logically Partitioned Data Processing System"; and U.S. Pat. No. 4,843,541, entitled "Logical Resource Partitioning Of A Data Processing."

At times, a processor running in a multi-processor system, such as a logically partitioned system, may experience errors that are considered recoverable. An error is typically classified as recoverable if the error can be corrected with no loss of data. Once a processor has experienced a certain number of recoverable errors, it is probable that the processor is going to experience a non-recoverable (i.e., fatal) error in the near future. Hence, a recoverable error is also commonly referred to as a predictive failure (or predictive of failure). A non-recoverable error of a processor in a multi-processor system is a catastrophic event that leads to a check-stop condition in which all processors in the system are stopped, and an initial program load (IPL) of the system is performed with the failed processor persistently deconfigured (effectively removed) from the system.

An IPL (also referred to as a system boot process) generally refers to the process of taking a system from a powered-off or non-running state to the point of loading operating system specific code. This process could include running various tests on components and, in a multi-processor system all functioning processors would go through the IPL process, which may require a significant amount of time. Considering the fact that a logically partitioned system may include several partitions, a system IPL due to a check-stop condition caused by a processor failure may represent unacceptable downtime for the several partitions.

Therefore, in an effort to avoid check-stop conditions caused by fatal errors, it may be desirable to give up use of a failing processor when a number of recoverable errors are detected. Recoverable errors may be detected by a processor that is separate from the processors used to run operating systems, commonly referred to as a service processor. In a conventional multiprocessor system, the operating system can give up the use of the failing processor to prevent the occurrence of a check-stop condition. After giving up the failing processor, the operating system may then keep running or, if available, the failing processor may be replaced with a known good spare processor. The system may have one or more spare processors for a number of reasons. For example, in a capacity-on-demand system in which processing capacity is paid for by customers, there may be processors in the system which are not paid for by the customer (unlicensed processors). As another example, in a logically partitioned system, a (licensed) processor may not have been assigned to any partition.

Figure 1:
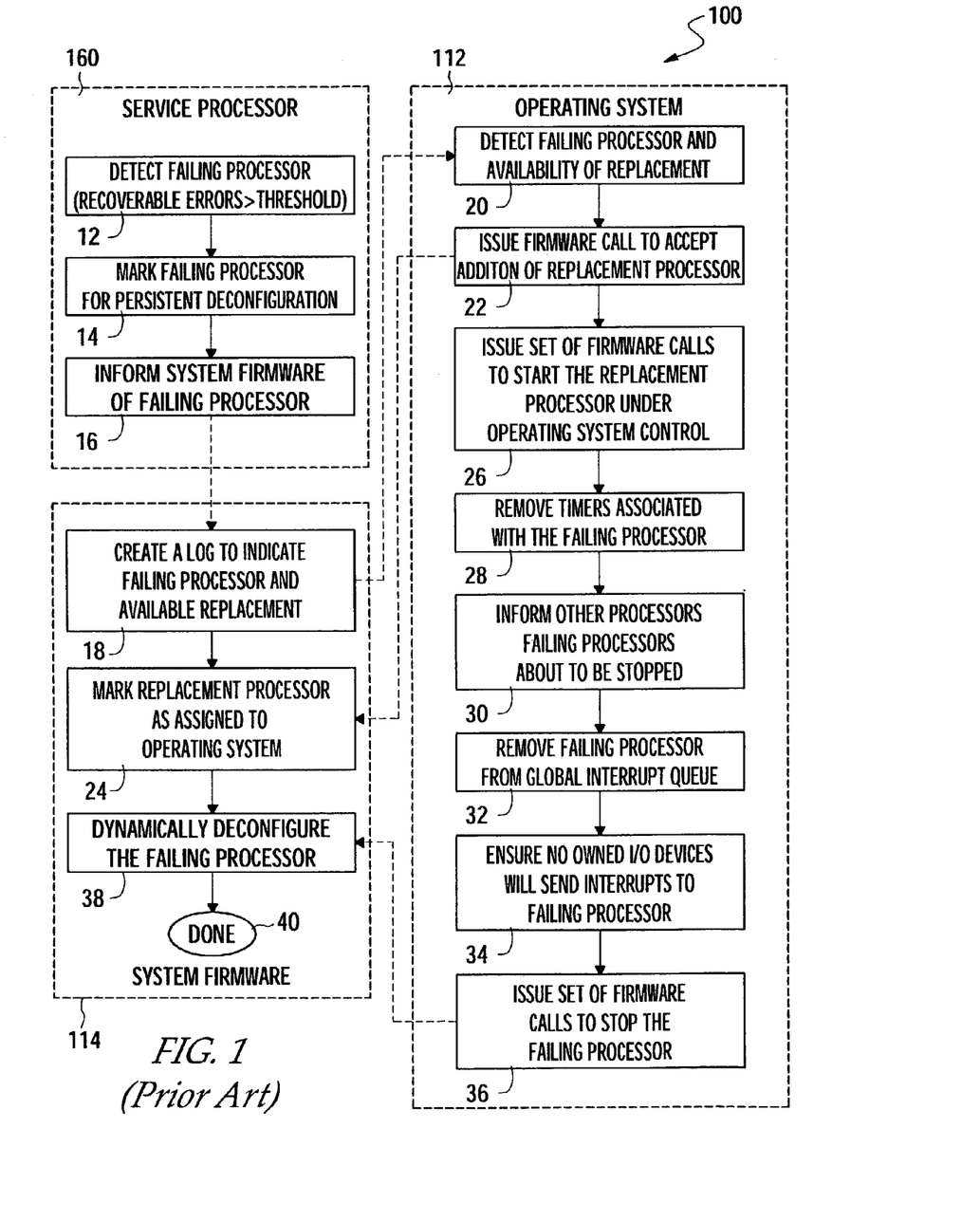
FIG. 1 is a flow chart illustrating exemplary operations for replacement of a failing processor in accordance with the prior art.

FIG. 1 illustrates a flow diagram of exemplary operations for replacing a failing processor in a conventional multi-processor system. The operations of FIG. 1 are typically performed by a number of different components of a multi-processor system, including an operating system 112, system firmware 114, and a service processor 160. As illustrated, conventional replacement of a failing processor typically requires a number of complex interactions between the operating system and the system firmware.

The operations begin at step 12, when the service processor 160 detects a failing processor (e.g., a processor that has exceeded an allowable threshold number of recoverable errors). At step 14, the service processor 160 marks the processor to ensure the failing processor is not enabled on a subsequent IPL (such marking is commonly referred to as persistent deconfiguration). At step 16, the service processor 160 informs the system firmware 114 of the failing processor.

At step 18, system firmware 114 creates a log (for use by the operating system 112) to indicate a processor is failing and there is an available replacement. At step 20, the operating system 112 accesses the log (e.g., through a particular firmware call commonly referred to as an event scan) and detects the failing processor and the availability of a replacement. At step 22, the operating system 112 issues a firmware call to accept the addition of the replacement process. In response, system firmware 114 marks the replacement processor as assigned to the operating system 112, at step 24. At step 26, the operating system 112 issues a set of firmware calls to start the replacement processor under operating system control. At this point, the operating system 112 is now running with excess capacity, as the failing processor has not yet been given up.

Therefore, the operating system 112 takes a number of additional steps to deconfigure the failing processor from the operating system's point of view. For example, the operating system may remove timers associated with the failing processor, at step 28, inform other processors the failing processor is about to be stopped, at step 30, remove the failing processor from a global interrupt queue (a set of processors designated for interrupt handling), at step 32, and ensure no I/O device owned by the operating system 112 will send interrupts to the failing processor, at step 34. The operating system 112 then makes yet another series of specialized calls to system firmware 114 to stop the failing processor. In response, at step 38, system firmware 114 migrates all current workload away from the failing processor and prevents any new workload from being added, a process commonly referred to as dynamic deconfiguration (recall the failing processor was marked for persistent deconfiguration, at step 14, by the service processor 160, to ensure the failing processor is not restarted upon an IPL). Finally, having replaced the failing processor, the operations are terminated, at step 40.

This conventional technique for replacing a failing processor has a number of disadvantages. First, as illustrated in FIG. 1 and described above, the conventional technique requires multiple complex steps coordinated between the operating system and system firmware. Second, because of the required involvement of the operating system, each operating system must be separately designed to support processor replacement, which, for a logically partitioned system, runs counter to the objective of running different operating systems with minimal modification.

Accordingly, there is a need for an improved method and system for replacing a failing processor, preferably that requires little or no interaction on the part of the operating system.

SUMMARY OF THE INVENTION

The present invention generally is directed to a method, article of manufacture, and system for replacing a failing processor.

One embodiment provides a method for replacing a failing processor in a multiprocessor system running at least one operating system. The method generally includes, in system firmware, detecting a failing processor, identifying an available replacement processor, saving a state of the operating system on the failing processor, redirecting interrupts from devices owned by the operating system from the failing processor to the replacement processor, and restoring the saved state of the at least one operating system on the replacement processor.

Another embodiment provides a computer-readable medium containing a program to include as system firmware in a multi-processor system for replacing a failing processor in a manner transparent to an operating system run on the multi-processor system. When executed by a processor, the program performs operations generally including detecting at least a threshold number of recoverable errors has occurred on a first processor, identifying a second processor available for replacing the first processor, saving a state of the operating system on the first processor, redirecting interrupts from devices owned by the operating system from the first processor to the second processor, restoring the saved state of the operating system on the second processor, and deconfiguring the first processor.

Another embodiment provides a multi-processor system including at least one assigned processor, at least one unassigned processor, at least one operating system running on the at least one assigned processor, and system firmware. The system firmware is generally configured to, in response to detecting the occurrence of one or more recoverable errors in the at least one assigned processor, save a state of the operating system on the assigned processor, redirect interrupts from devices owned by the operating system from the at least one assigned processor to the at least one unassigned processor, and restore the saved state of the operating system on the at least one unassigned processor.

Another embodiment provides a logically partitioned computer system generally including a plurality of logical partitions, each having an associated operating system, multiple processors including at least a first processor executing code for at least one of the logical partitions and at least a second spare processor, and system firmware. The system firmware is generally configured to, in response to detecting the occurrence of one or more recoverable errors in the first processor, save a state of the operating system associated with the logical partition on the first processor, redirect interrupts from devices owned by the associated operating system from the first processor to the second processor, and restore the saved state of the operating system on the second processor.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a method, system, and article of manufacture for replacement of a failing processor. In contrast to the prior art, the replacement may be performed through a coordinated series of operations performed by a service processor and system firmware, without intervention by the operating system. In other words, the replacement may be transparent to the operating system. Thus, a number of complex steps conventionally requiring coordination between the operating system and the system firmware may be eliminated. Further, making replacement of a failing processor transparent to the operating system eliminates the need for each operating system to be designed to support processor replacement, which may facilitate the use of standard operating systems.

One embodiment of the invention is implemented as a program product for use with a computer system such as, for example, the multi-processor computer system 100 shown in FIG. 2 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications and the Internet.

In general, the routines executed to implement the embodiments of the invention, may be part of an operating system or a specific application, component, program, module, object, or sequence of instructions, embodied, for example, as system firmware 114 and firmware of service processor 160. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified or implied by such nomenclature.

An Exemplary Multi-Processor System

Figure 2:
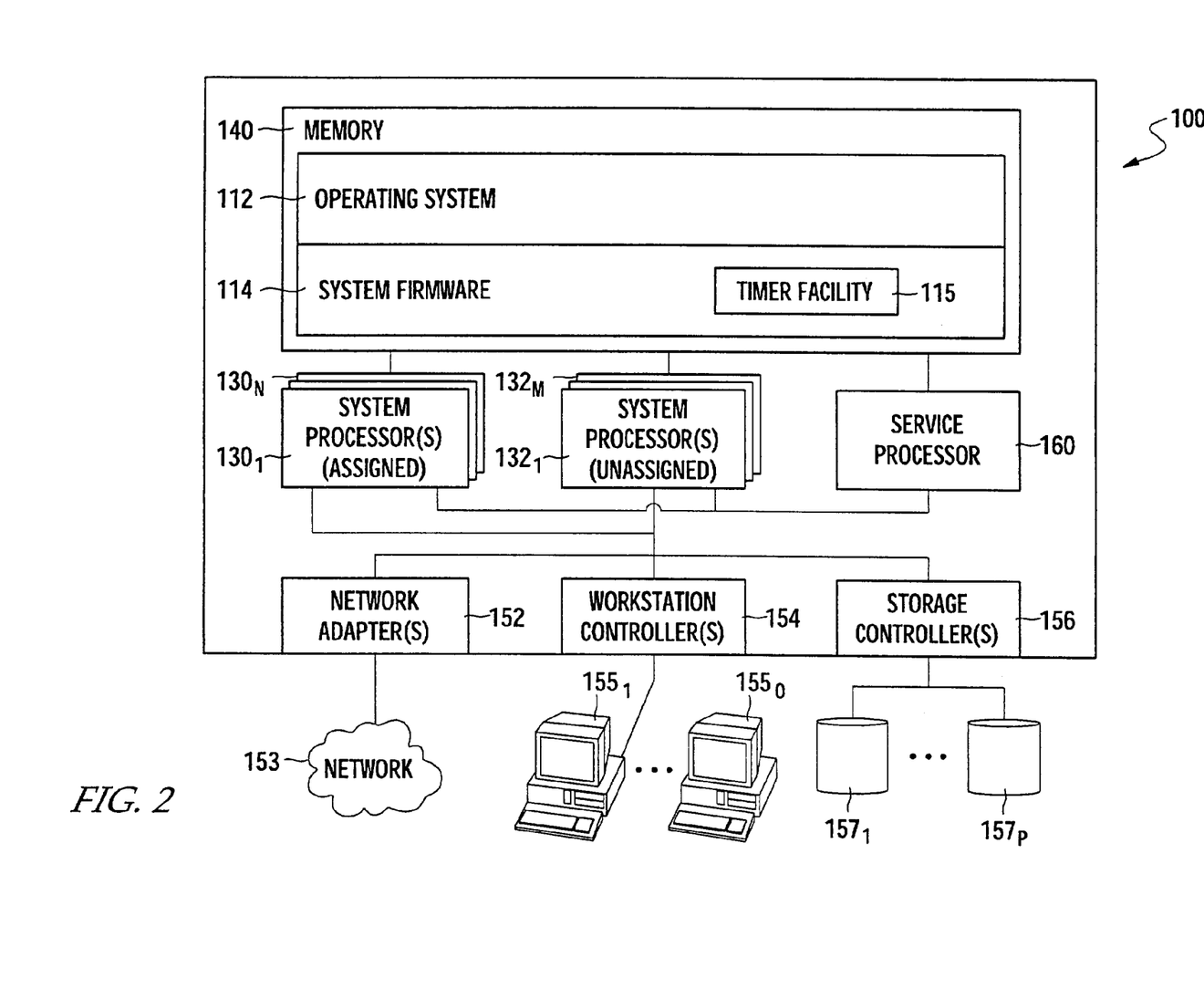
FIG. 2 is a logically partitioned computer system illustratively utilized in accordance with the invention.

The major hardware components of a multiprocessor computer system 100 utilized in accordance with embodiments of the present invention are shown in FIG. 2. While various system components are shown at a high level, it should be understood that a typical computer system contains many other components not shown, which are not essential to an understanding of the present invention. In one embodiment, the system 100 is an eServer iSeries computer system available from International Business Machines (IBM) of Armonk, N.Y., however, embodiments of the present invention may be implemented on other multiprocessor computer systems.

In general, a first set of multiple system processors $130_1$-$130_N$ (collectively, processors 130) concurrently perform basic machine processing function on instructions and data from memory 140. For example, the processors 130 may process instructions and data (code) from an operating system 112 (therefore, the processors 130 may be described as being assigned to the operating system 112). The system processors 130 may also process code from system firmware 114. In general, the system firmware 114 represents a layer of firmware that runs on the same system processors 130 as the operating system 112 and is used to provide a low level interface to various hardware components while isolating the operating system 112 from the details of that hardware access.

As illustrated, exemplary hardware components may include one or more network adapters 152, workstation controllers 154, and storage controllers 156. The network adapters 152 represent any suitable type interface to connect the system 100 to a network 153, which may be any combination of a local area network (LAN), wide area network (WAN), and any other type network, including the Internet. The workstation controllers 154 and storage controllers 156 allow the system 100 to connect with one or more workstations $155_1$-$155_O$ and a variety of storage devices $157_1$-$157_P$, such as direct access storage devices (DASD), tape drives, optical drives, and the like, respectively.

As illustrated, the system firmware 114 may also communicate with a service processor 160 of the system 100. The system processor 160 is separate from the system processors used to run the operating system 112 and typically runs specialized firmware code to perform portions of an initial program load (IPL), including controlling some component testing. Thus, the service processor 160 typically has controlling access to various hardware components, including the ability to start and stop system processors and read fault isolation registers in various system components. The service processor 160 may be implemented as a microprocessor, such as a PowerPC processor available from IBM, configured (e.g., programmed via internal or external memory) to perform the operations and functions described herein.

The service processor 160 may be configured to help diagnose system problems that occur during run time. For example, the service processor 160 may be configured to detect recoverable errors that occur in one or more the processors 130. The service processor 160 may detect the recoverable errors, as indicated by hardware detection logic (not shown) that may include various mechanisms built in to the hardware logic of the processors 130 to check for hardware faults (e.g., bus parity and ECC protection circuitry, invalid state checking for various logic state machines, range checking logic for bus addresses, and the like).

As previously described, once a processor has experienced a certain number of recoverable errors, it is probable that the processor is going to experience a non-recoverable error in the near future. Therefore, the service processor 160 may be configured to record the occurrence of recoverable errors (for each assigned processor 130) in order to detect when a threshold number of recoverable errors has been reached. The threshold number may be chosen to correspond to a number of recoverable errors that has been found to provide a good indication the processor will fail. In order to avoid a fatal error, and associated check-stop conditions, in response to detecting a processor has reached (or exceeded) the threshold number of recoverable errors, it may notify the system firmware 114 the processor is failing.

As previously described, in conventional multiprocessor systems, the system firmware 114 would then typically create a log to indicate to the operating system 112 the processor was failing. The operating system 112 would then perform a series of operations, via calls to the system firmware 114, to give up the use of the failing processor, stop the processor (dynamic deconfiguration), and replace the failing processor with an available "good" processor. In contrast to these conventional systems, and in accordance with aspects of the present invention, the system firmware 114 may be configured to replace the failing processor with an available (spare) processor in a manner that is transparent to the operating system.

For some embodiments, the system firmware 114 may detect and replace the failing processor through the use of a timer facility 115, which may be configured to service interrupts generated by processor timers dedicated for use by the system firmware 114 (there may be one such "system firmware timer" for each processor in the system). In other words, the timer facility 115 may be non-accessible to the operating system 112 (e.g., the timer facility may not utilize any registers of the failing processor that are accessible to the operating system 112). The timer facility 115 is generally configured (e.g., programmed) to periodically present an interrupt to system firmware 114 (e.g., upon the expiration of an associated processor timer). As will be described in greater detail below, the system firmware 114 may use the timer facility 115 to replace the failing processor 130 without knowledge of the operating system.

If present, the system firmware 114 may replace the failing processor 130 with a known good processor. As illustrated, the system 100 may include a number of spare processors $132_1$-$132_M$ (collectively processors 132) that have not been assigned to the operating system 112. As previously described, the system 100 may implement a "capacity-on-demand" structure in which customers pay for processing power (e.g., as processor units) and the unassigned processors 132 may be "unlicensed" processors which are not paid for by the customer. As an alternative, in a logically partitioned capacity-on-demand system, the unassigned processors 132 may be licensed processors that have not yet been assigned to any partition.

An Exemplary Logically Partitioned System

Figure 3A:
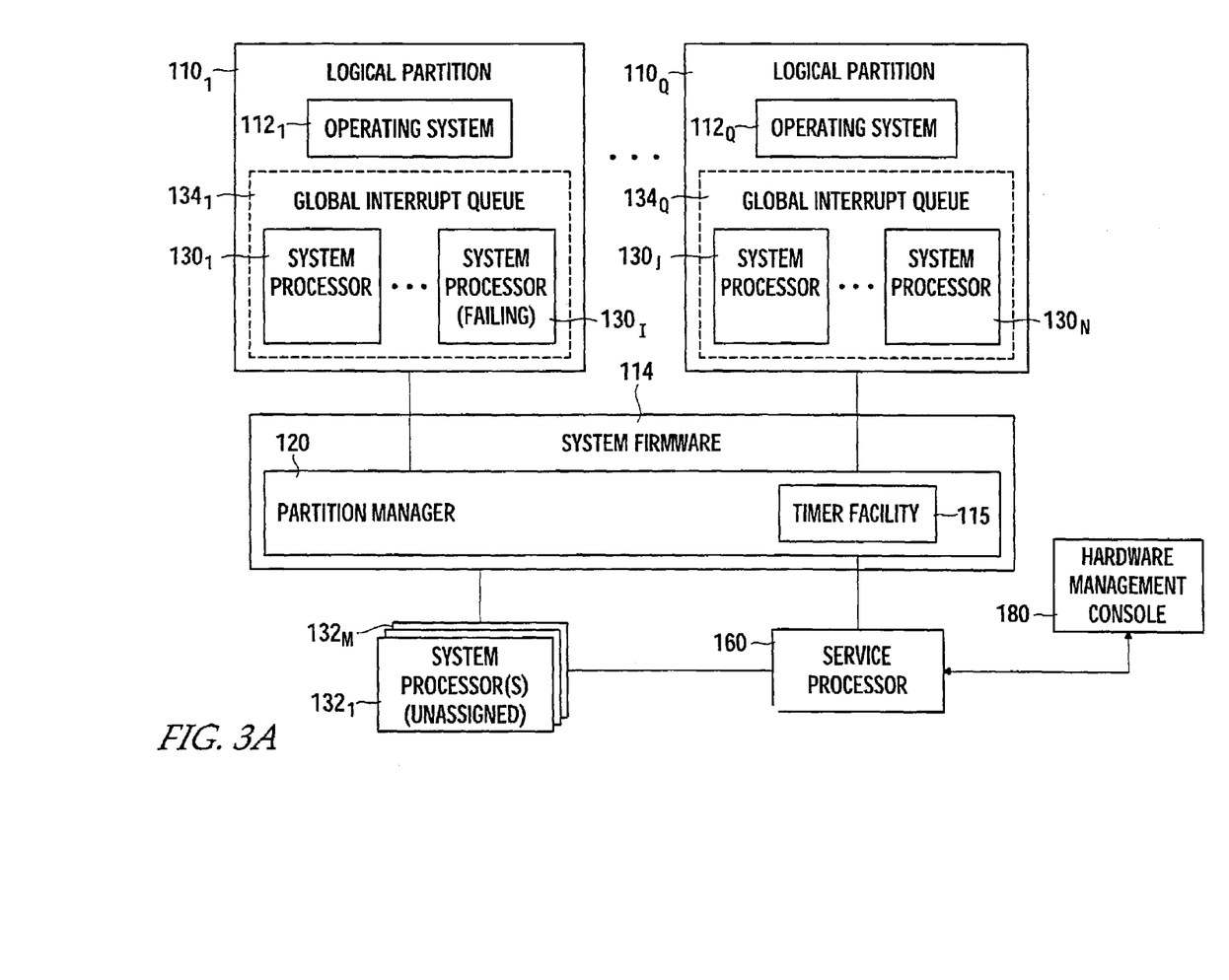
FIG. 3 is a relational view of hardware and software components in accordance with one embodiment of the invention.

FIG. 3A illustrates a logically partitioned computer system having a first set of processors 130 assigned to one or more logical partitions $110_1$-$110_Q$ (collectively partitions 110), each having its own operating system $112_1$-$112_Q$, respectively, and a second set of unassigned processors 132. As illustrated, processors $130_1$-$130_I$ are assigned to the first partition $110_1$, while processors $130_J$-$130_N$ are assigned to partition $110_Q$. While FIG. 3A illustrates processors 130 that are each dedicated to a given partition, for some embodiments, one or more of the processors 130 may be shared among multiple partitions 110.

Logical partitioning is indeed logical rather than physical. A general purpose computer suitable for logically partitioning (such as that shown in FIG. 2) typically has physical data connections such as buses running between a resource in one partition and one in a different partition, and from a physical configuration standpoint, there is typically no distinction made with regard to partitions. Generally, logical partitioning is enforced by a layer of system firmware, referred to herein as a partition manager 120, although there may be a certain amount of hardware support for logical partitioning, such as hardware registers which hold state information. In other words, while there is nothing, from a hardware standpoint, which prevents a task executing in partition $110_1$ from writing to an I/O device in partition $110_Q$, the partition manager 120 (and possibly associated hardware) prevents access to the resources in other partitions.

A system administrator (or other similarly authorized user) may configure logical partitioning and perform other low-level system management via an interface, such as a hardware management console (HMC) 180. The service processor 160 may serve as an interface between the partition manager 120 and the HMC 180. The HMC 180 may be implemented as a custom configured personal computer (PC) connected to the computer system 100 (using the service processor 160 as an interface) and used to configure logical partitioning and other low-level system management. For some embodiments, similar functionality may be provided via one or more service partitions (not shown), or other similar type interfaces, that may also interface with the service processor 160.

Transparent Processor Replacement

Figure 3B:
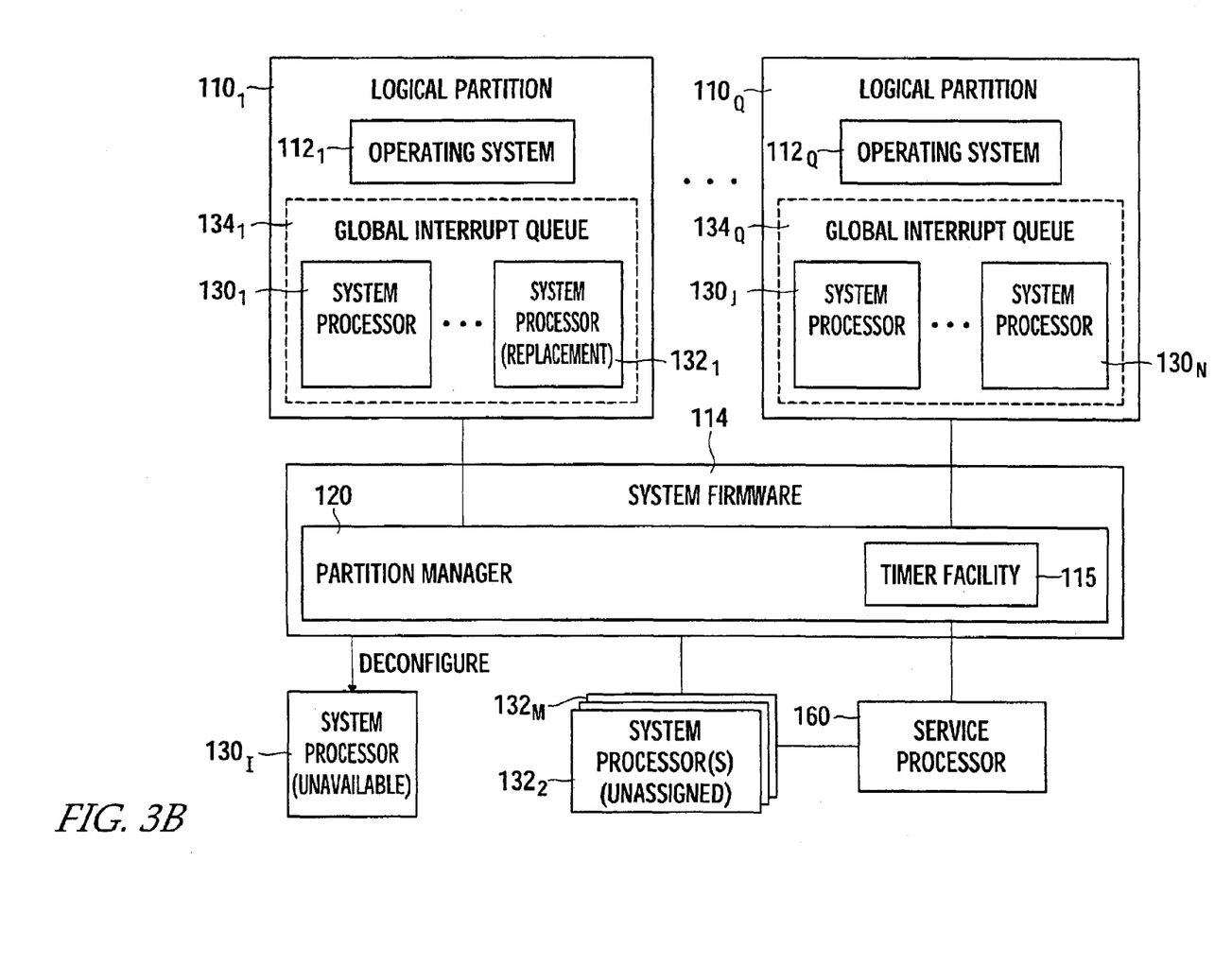
Figure 4:
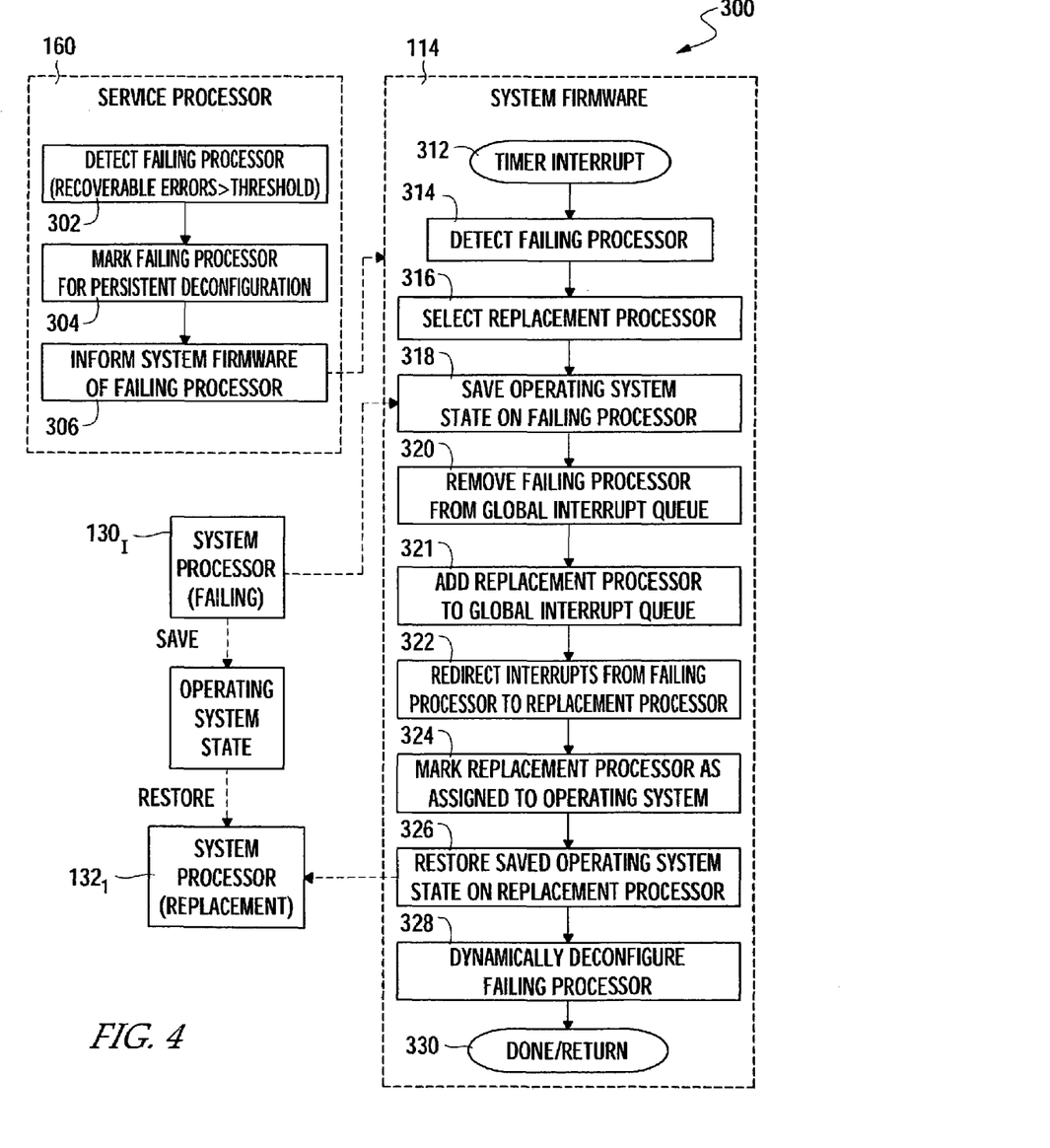
FIG. 4 is a flow chart illustrating exemplary operations for transparent replacement of a failing processor in accordance with an embodiment of the present invention.

As previously described, the service processor 160 and system firmware 114 may cooperate to detect and replace a failing processor 130 assigned to one of the partitions 110 prior to fatal error, in a manner that is transparent to the corresponding operating system 112 to which the failing processor is assigned. FIG. 4 illustrates exemplary operations 300 that may be performed to detect and transparently replace a failing processor. The operations may be best described with reference to FIGS. 3A and 3B. As illustrated, operations 302-306 may be performed by the service processor 160, while operations 312-330 may be performed in system firmware 114. As shown, the service processor 160 may perform the same operations as those performed by the service processor 160 according to conventional replacement of FIG. 1.

The operations 300 begin at step 302, by detecting a failing processor. For example, the service processor 160 may detect a recoverable error in processor $130_I$ (labeled in FIG. 3A as failing) assigned to partition $110_1$ that puts the processor at or in excess of a threshold number of recoverable errors. At step 304, the service processor 160 marks the failing processor ($130_I$) for persistent deconfiguration, to ensure the processor is not started during a subsequent IPL. For example, the service processor 160 may write to a persistent memory location (maintained in the absence of power) that indicates which of the processors 130 and 132 are available for assignment to partitions 110 during an IPL. At step 306, the service processor 160 informs the system firmware 114 of the failing processor, for example, by posting a message to the system firmware via a low level communications mechanism (or "mailbox") between the service processor 160 and system firmware 114. The implementation and use of such a message mailbox is described in the commonly owned U.S. Pat. No. 6,279,046, entitled "Event-Driven Communications Interface for Logically Partitioned Computer," herein incorporated by reference in its entirety.

As illustrated, system firmware 114 operations may begin at step 312, for example, within the timer facility 115 upon occurrence of an interrupt generated in response to expiration of the system firmware timer of the failing processor $130_f$. At step 314, the failing processor $130_f$ is detected, for example, by reading a mailbox message posted by the service processor 160. At step 316, a replacement processor is selected, for example, processor $132_1$ from the set of unassigned processors 132. At step 318, the state of the operating system 112 on the failing processor is saved. For example, the state of a set of registers of the failing processor, at the time of the timer interrupt, may be saved for use in initializing the replacement processor selected at step 316.

The failing processor $130_f$ may have handled various interrupts for the partition $110_1$. For example, each partition 110 may have a global interrupt queue (GIQ) 134 that essentially designates which of the set of the processors 130 assigned to the partition 110 may be the target of an interrupt by an I/O device. System hardware can choose one of the processors in a GIQ 134 for presentation of the interrupt. As illustrated, the failing processor $130_f$ may be included in the GIQ $134_1$ of the partition $110_1$. Therefore, to prevent interrupts from being directed to the failing processor $130_f$, the failing processor $130_f$ is removed from the GIQ $134_1$, at step 320. As shown in FIG. 3B, the replacement processor $132_1$ is added to the GIQ 134, at step 321, and interrupts are redirected from the failing processor $130_f$ to the replacement processor $132_1$, at step 322.

At step 324, the replacement processor $132_1$ is assigned to the operating system and, at step 326, the operating system state (saved from the failing processor $130_f$, at step 318) is restored on the replacement processor $132_1$. At step 328, the failing processor $130_f$ is dynamically deconfigured. For example, the partition manager 120 may migrate the workload of the failing processor $130_f$ to the replacement processor $132_1$ and dispatch any new workload to one of the other processors 130. Recall that the failing processor $130_f$ was previously marked for persistent deconfiguration (by the service processor 160 at step 304), which should ensure that the failing processor $130_f$ is not again assigned to any of the partitions 110 on a subsequent IPL. Thus, in FIG. 3B, the failing processor $130_f$ is shown as unavailable, the replacement processor 132, is assigned to the partition 110 and the set of unassigned processors 132 (available to replace processors that fail in the future) now includes processors $132_2$-$132_M$.

As previously described, in some instances, one or more processors of a multi-processor system may be licensed to paying customers as part of a capacity-on-demand arrangement. In such an instance, a failing licensed processor may be replaced by an spare unlicensed processor. Therefore, for some embodiments, to keep the number of licensed processors consistent before and after replacement, system firmware 114 may mark the failing processor $130_f$ as unlicensed and the replacement processor $132_1$ as licensed, as part of the replacement process.

At step 330, the operations 300 are exited, for example, by returning from the interrupt handler of the timer facility 115. Processing of operating system code should then resume on the replacement processor $132_1$ at the same point at which the failing processor $130_f$ left off. In other words, the replacement of the failing processor $130_f$ required no intervention from operating system $112_1$, and the replacement should be unnoticeable (i.e., transparent) to the operating system $112_1$.

Of course, the particular operations 300 illustrated in FIG. 4 are exemplary only, and various modifications may be made within the scope of the present invention. For example, if no replacement processor is available, system firmware 114 may still deconfigure the failing processor $130_f$ and the system may continue to run with without replacing the failing processor $130_f$ (albeit, with degraded performance).

Further, it should be noted that, while the illustrated operations 300 generally apply to replacing a processor dedicated to a partition, because there is no involvement of the operating system, similar operations may be performed to replace a processor in a pool of processors shared between multiple partitions. For example, when system firmware 114 is informed by the service processor 160 that a processor in the shared pool is failing, it may simply suspend the dispatching of partition code on the failing processor, begin dispatching partition code on the replacement processor, add the replacement processor to the pool and remove the failing processor from the pool. The concepts of processor pools shared among multiple partitions are described in detail in the commonly owned patent applications, Ser. No. 09/672, 043, filed Apr. 29, 2001, entitled "Method and Apparatus for Allocating Processor Resources in a Logically Partitioned Computer System," which is herein incorporated by reference.

CONCLUSION

By replacing a failing processor in a manner that is transparent to an operating system, embodiments of the present invention facilitate the use of standard operating systems in multi-processor systems. In other words, the operating systems do not need to support the replacement of failing processors, which may be handled in the system firmware. The techniques described herein may be utilized to advantage in any type of multi-processing system, particularly logically partitioned systems running multiple operating systems. For some embodiments, service providers may deploy a multi-processor system capable of transparent processor replacement as part of a capacity-on-demand scheme. With the ability to transparently replace licensed processors with unlicensed processors regardless of a chosen operating system, service providers may be able to offer a previously unattainable level of assurance to customers that they will receive the processing power for which they paid.

While the foregoing is directed to embodiments of the present invention, other and further embodiments of the invention may be devised without departing from the basic scope thereof, and the scope thereof is determined by the claims that follow.

What is claimed is:

1. A method for replacing a failing processor in a multi-processor system running at least one operating system comprising, in system firmware:

detecting a failing processor in an interrupt handling routine, wherein the interrupt handing routine is entered upon expiration of a timer implemented within the system firmware and associated with the failing processor;

identifying an available replacement processor;

saving a state of the at least one operating system on the failing processor;

redirecting interrupts from devices owned by the at least one operating system from the failing processor to the replacement processor; and restoring the saved state of the at least one operating system on the replacement processor.

2. The method of claim 1, wherein redirecting interrupts from devices owned by the at least one operating system from the failing processor to the replacement processor comprises:

removing the failing processor from a global interrupt queue; and adding the replacement processor to the global interrupt queue.

3. The method of claim 1, wherein detecting a failing processor comprises detecting that at least a threshold number of recoverable errors has occurred on the processor.

4. The method of claim 3, wherein detecting that at least a threshold number of recoverable errors has occurred on the processor comprises receiving notice from a service processor that at least a threshold number of recoverable errors has occurred on the processor.

5. The method of claim 1, wherein:

the failing processor was licensed to a user prior to detecting the failing processor; and the method further comprises marking the failing processor as unlicensed.

6. The method of claim 1, wherein the identifying, saving, redirecting, and restoring are performed within the interrupt handler routine entered in response to expiration of the timer associated with the failing processor.

7. The method of claim 1, wherein the failing processor was assigned to a logical partition of the multiprocessor system, and the method further comprises assigning the replacement processor to the logical partition.

8. The method of claim 1, wherein the failing processor was in a pool of processors shared between one or more logical partitions of the multiprocessor system, and the method further comprises:

adding the replacement processor to the shared pool;

ceasing to dispatch code to the failing processor; and dispatching code to the replacement processor.

9. The method of claim 1, further comprising marking the failing processor to prevent the failing processor from being assigned in a subsequent initial program load.

10. A tangible computer-readable storage medium containing a program to be included as system firmware in a multi-processor system for replacing a failing processor in a manner transparent to an operating system run on the multi-processor system which, when executed by a processor, performs operations comprising:

providing a timer facility implemented within the system firmware: entering an interrupt handing routine upon expiration of a timer within the timer facility and associated with a first processor:

in the interrupt handling routine, detecting at least a threshold number of recoverable errors has occurred on the first processor;

identifying a second processor available for replacing the first processor;

saving a state of the operating system on the first processor;

redirecting interrupts from devices owned by the operating system from the first processor to the second processor;

restoring the saved state of the operating system on the second processor; and deconfiguring the first processor.

11. The tangible computer-readable storage medium of claim 10, wherein deconfiguring the first processor comprises:

distributing code previously destined for the first processor to one or more other processors; and marking the first processor as unavailable.

12. The tangible computer-readable storage medium of claim 10, wherein the operations further comprise marking the first processor to prevent the first processor from being subsequently assigned.

13. The tangible computer-readable storage medium of claim 10, wherein the identifying, saving, redirecting, and restoring are performed within the interrupt handler routine entered in response to receiving a timer interrupt associated with the first processor.

14. The tangible computer-readable storage medium of claim 10, wherein the first processor was licensed to a user and the operations further comprise:

marking the first processor as unlicensed; and marking the second processor as licensed.

15. A multi-processor system, comprising:

at least one assigned processor;

at least one unassigned processor;

at least one operating system running on the at least one assigned processor; and system firmware comprising a timer facility, the timer facility comprising an interrupt handling routine entered upon expiration of a timer associated with the at least one assigned processor; and wherein the system firmware is configured to detect the occurrence of the one or more recoverable errors in the interrupt handling routine, and in response to detecting an occurrence of one or more recoverable errors in the at least one assigned processor, save a state of the at least one operating system on the at least one assigned processor, redirect interrupts from devices owned by the at least one operating system from the at least one assigned processor to the at least one unassigned processor, and restore the saved state of the at least one operating system on the at least one unassigned processor.

16. The multi-processor system of claim 15, further comprising a service processor configured to detect recoverable errors in the at least one assigned processor and notify the system firmware in response to detecting at least a threshold number of recoverable errors in the at least one assigned processor.

17. The multi-processor system of claim 15, wherein, the at least one assigned processor was licensed to a user, the at least one unassigned processor was unlicensed to the user, and the system firmware is further configured to mark the at least one assigned processor as unlicensed and mark the at least one unassigned processor as licensed.

18. A logically partitioned computer system, comprising:

a plurality of logical partitions, each having an associated operating system;

multiple processors including at least a first processor executing code for at least one of the logical partitions and at least a second spare processor; and system firmware comprising a timer facility, the timer facility comprising an interrupt handling routine entered upon expiration of a timer associated with the first processor; and wherein the system firmware is configured to detect the occurrence of the one or more recoverable errors in the interrupt handling routine, and in response to detecting the occurrence of one or more recoverable errors in the first processor, save a state of the operating system associated with the at least one logical partition on the first processor, redirect interrupts from devices owned by the associated operating system from the first processor to the second processor, and restore the saved state of the associated operating system on the second processor.

19. The logically partitioned computer system of claim 18, wherein the system firmware is further configured to:
assign the second processor to the at least one logical partition; and
mark the first processor as unavailable to prevent the first processor from being subsequently assigned to any of the logical partitions.

20. The logically partitioned computer system of claim 18, wherein the first processor is part of a pool of processors shared between one or more of the logical partitions and the system firmware is further configured to add the second processor to the pool, cease dispatching code to the first processor, and begin dispatching code to the second processor.

* * * * *